United States Patent
Hidehira et al.

(10) Patent No.: US 7,098,970 B2
(45) Date of Patent: Aug. 29, 2006

(54) LIQUID CRYSTAL DISPLAY DEVICE AND ITS MANUFACTURING METHOD

(75) Inventors: Masanobu Hidehira, Tokyo (JP); Michiaki Sakamoto, Tokyo (JP); Shouichi Kuroha, Tokyo (JP); Mamoru Okamoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 489 days.

(21) Appl. No.: 10/081,238

(22) Filed: Feb. 25, 2002

(65) Prior Publication Data

US 2002/0118318 A1  Aug. 29, 2002

(30) Foreign Application Priority Data

Feb. 23, 2001  (JP)  ............... 2001-049492

(51) Int. Cl.
*G02F 1/136* (2006.01)
*G02F 1/1343* (2006.01)

(52) U.S. Cl. ................. 349/44; 349/139
(58) Field of Classification Search ........ 349/110, 349/43, 44, 139
See application file for complete search history.

(56) References Cited

U.S. PATENT DOCUMENTS 5,317,432 A * 5/1994 Ino .............. 349/39
5,831,707 A * 11/1998 Ota et al. ............ 349/141
5,844,641 A * 12/1998 Jun et al. ............ 349/38
6,115,088 A * 9/2000 Zhang et al. ........ 349/39
6,118,505 A * 9/2000 Nagata et al. ....... 349/106
6,147,722 A * 11/2000 Shimada et al. ..... 349/43
6,249,327 B1 * 6/2001 Murade et al. ...... 349/43
6,392,735 B1 * 5/2002 Tani .................... 349/156
6,490,014 B1 * 12/2002 Ohtani et al. ........ 349/38
2002/0008805 A1 * 1/2002 Kawakami et al. ... 349/61
2002/0089615 A1 * 7/2002 Sakamoto et al. .... 349/43
2002/0105609 A1 * 8/2002 Moon .................. 349/113

FOREIGN PATENT DOCUMENTS

| JP | 3-237432 | 10/1991 |
| JP | 2758410 | 3/1998 |
| JP | 2000-010121 | 1/2000 |
| JP | 2000-214483 | 8/2000 |
| JP | 2000-231123 | * 8/2000 |

* cited by examiner

*Primary Examiner*—Toan Ton
(74) *Attorney, Agent, or Firm*—Young & Thompson

(57) ABSTRACT

In an active matrix type liquid crystal display device comprising a TFT having gate lines and data lines formed in a matrix manner and being connected to a source line, a contact hole for connecting the source line with a pixel electrode is formed in a position overlapping a disclination line. The contact hole is formed in a position overlapping a capacitance portion of the gate line. The gate line and the source line are provided to oppose to each other, and electrostatic capacitance is stored therebetween.

10 Claims, 9 Drawing Sheets

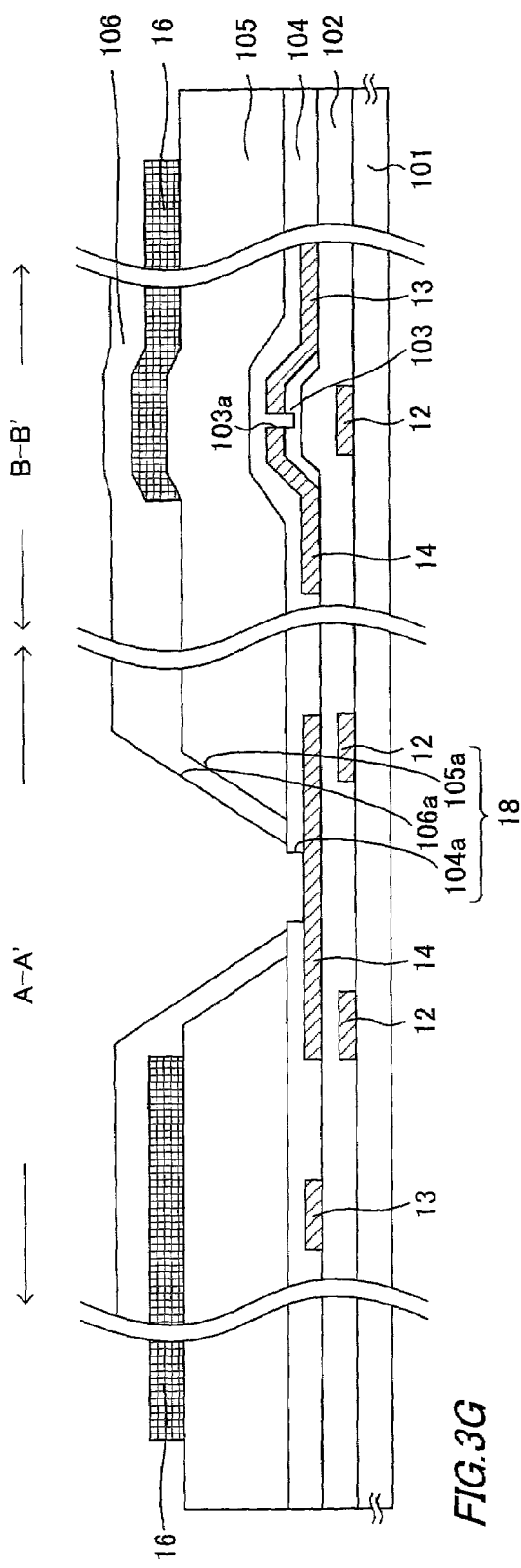
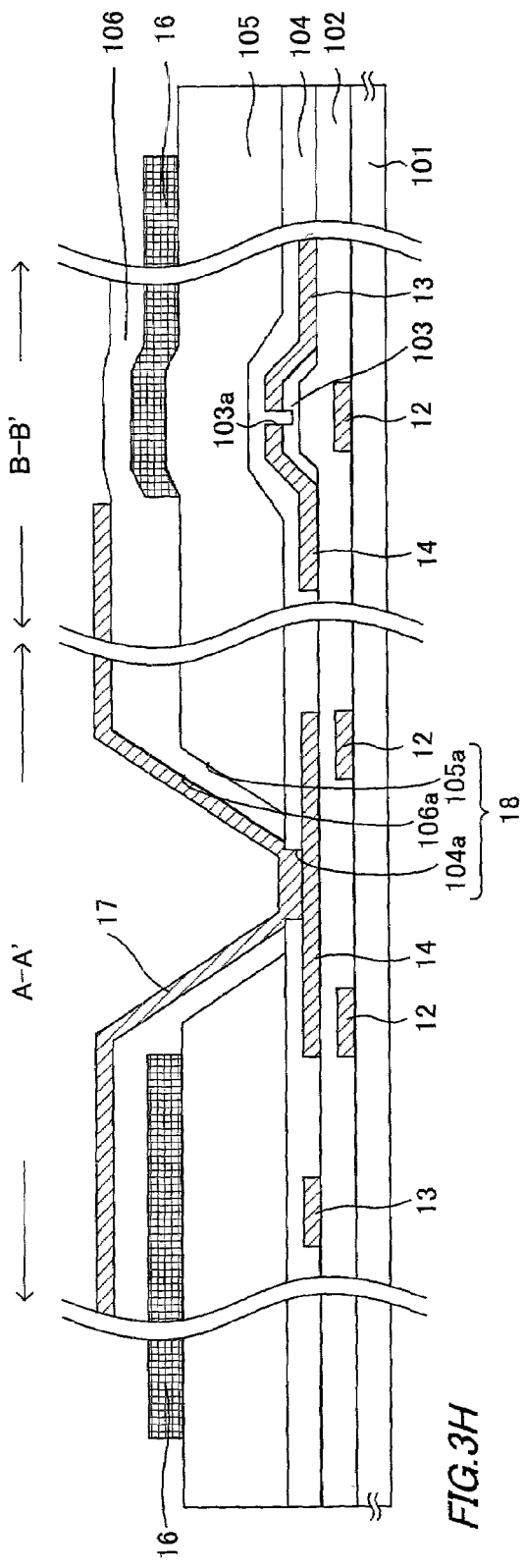
FIG.3G
FIG.3H

| DOT PITCH (μm) | DEFINITION (dpi) | CONTACT HOLE AREA RATIO (%) |
|---|---|---|
| 300 | 84.7 | 0.65 |
| 250 | 101.6 | 0.98 |
| 200 | 127.0 | 1.47 |
| 150 | 169.0 | 2.61 |
| 126 | 201.6 | 3.70 |
| 100 | 254.0 | 5.88 |
| 85 | 298.8 | 8.13 |

FIG.4

LIQUID CRYSTAL DISPLAY DEVICE AND ITS MANUFACTURING METHOD

BACKGROUND OF THE INVENTION

1. Field of the Invention

The present invention relates to a liquid crystal display device and its manufacturing method, and particularly relates to an active matrix type liquid crystal display device having a color filter on its element substrate and its manufacturing method.

2. Description of the Related Art

The active matrix liquid crystal display device comprises an element substrate with a switching element such as a transistor, etc., an opposite substrate arranged to be opposite to the element substrate, and a liquid crystal filled between the element substrate and opposite substrate.

The opposite substrate has a color filter (CF) and a black matrix. The color filter consists of color layers of red, green or blue arranged regularly. The black matrix is formed of a film with a light shielding property (opaque). The black matrix shields disclination of the liquid crystal to prevent a reduction in contrast.

The liquid crystal is filled in a space between the element substrate and opposite substrate. Alignment layers are formed on the opposite surfaces of the element substrate and opposite substrate respectively. The alignment layers are formed in such a manner that a resin film such as polyimide is formed on substrates and the resultant surfaces are subjected to alignment treatment such as rubbing. The alignment layers provide a predetermined alignment (orientation) to liquid crystal molecules in the liquid crystal.

Here, the disclination refers to an alignment defect in which discontinuity occurs in the alignment direction of liquid crystal molecules due to a level difference in the alignment surface of liquid crystal, distribution of an electric filed and an abrupt change in a driving voltage. Such liquid crystal alignment defect appears as a line or dot detect, resulting in deterioration of display quality. The disclination occurs in a display area overlapping with irregular portions on the surfaces of substrates, non-uniform portions of the liquid crystal alignment caused by variations in the degree of rubbing, and the like.

In the above structure in which the color filter and black matrix are provided on the opposite substrate, it is necessary to preform the black matrix with a width larger than that of an ideal masking area on design. The reason lies in ensuring a margin for error in the alignment of element substrate and opposite substrate. However, if the width of the black matrix is too wide, there occurs difficulty in setting an aperture ratio of liquid crystal display element largely, thereby decreasing brightness. Here, the aperture ratio means the percentage of a pixel area contributing to optical modulation to the entire surface area of the display area of a liquid crystal display panel.

In order to improve the aperture ratio of liquid crystal display element, there is disclosed the structure for forming a color filter and black matrix on an element substrate. This is referred to as CF (Color Filter)-On TFT structure, and the structure is described, for example, in Japanese Patent No. 2758410 and Unexamined Japanese Patent Application KOKAI Publication No. H3-237432.

In the CF-On TFT structure, the color filter and black matrix are formed on the element substrate. Accordingly, it is unnecessary to ensure a margin for alignment of the element substrate and opposite substrate. This makes it possible to simplify the manufacturing process and to achieve a high aperture ratio.

At the occasion of pushing forward high definition, the use of CF-On TFT structure makes it difficult to realize the high aperture ratio for the following reason.

More specifically, in the CF-On TFT structure, the size of contact hole for connecting a pixel electrode and a source electrode is relatively large, and an exclusive area for a contact hole accounts for a relatively high percentage in each pixel area. This is because the taper of the side surface of contact hole must be gently formed to prevent occurrence of level separation of the pixel electrode formed on the inner surface of contact hole. In order to make the taper gentle, a plurality of layers (passivation layer, color layer, overcoat layer, etc.), which separate the pixel electrode and source electrode, is patterned to form apertures respectively. In this case of forming a contact hole for each layer, it is necessary to ensure a margin for alignment for each patterning process. Resultantly, the size of contact hole is relatively large. The area for contact hole is generally shielded from light. Accordingly, the percentage of the area for the contact hole in the pixel area increases with the progress of high definition, resulting that the aperture ratio relatively decreases.

Moreover, the percentage of the area for the black mask for masking (shielding) the disclination occurring region relatively increases with the progress of high definition, though this is not limited to the CF-On TFT structure. Accordingly, the aperture ratio relatively decreases.

Thus, in the active matrix liquid crystal display device, even though the CF-On TFT structure is used, the percentage of masking area relatively increases, resulting in decreasing in the aperture ratio, if the high definition progresses and a pixel pitch becomes narrow. On the other hand, if the percentage of masking area is small in order to achieve high aperture ratio, disclination becomes conspicuous.

SUMMARY OF THE INVENTION

In order to obtain the above problem, it is an object of the present invention is to provide a liquid crystal display device that is capable of implementing a high aperture ratio and its manufacturing method.

Additionally, it is another object of the present invention is to provide a liquid crystal display device that is capable of masking disclination and its manufacturing method.

In order to achieve the objects according to one aspect of the present invention, there is provided a liquid crystal display device comprising:

a pair of substrates;

a liquid crystal sealed between said pair of substrates;

a plurality of data lines and a plurality of scanning lines, being arranged on one surface of one of said pair of substrates and crossing each other;

a switching element having one end of a current path connected to the corresponding data line and a control end connected to the corresponding scanning line;

a wiring connected to the other end of the current path of said switching element;

an insulating layer, being formed on said wiring and having a contact hole through which an end portion of said wiring is exposed;

a pixel electrode, being formed on said insulating later and electrically connected to the end portion of said wiring through the contact hole; and an alignment film, being formed on said pixel electrode and in contact with said liquid crystal, wherein said contact hole is formed at a position overlapping a region where disclination occurs.

The liquid crystal display device according to the one aspect of the present invention, wherein said insulating layer may be formed of a plurality of laminated insulating films, the insulating films may have openings individually which form said contact hole in a tapered shape as a whole.

The liquid crystal display device according to the one aspect of the present invention, wherein said insulating films may include a passivation film formed on the switching element, a color layer formed on said passivation film, and a flattening film formed on said passivation film and color layer, said contact hole may include openings formed in the passivation film, the color layer, and the flattening film, respectively, and the openings being formed in a tapered shape as a whole.

The liquid crystal display device according to the one aspect of the present invention, wherein said wiring may be made of a light shielding material, and said contact hole and at least a part of said region where disclination occurs may be shielded by said wiring.

The liquid crystal display device according to the one aspect of the present invention, wherein the scanning lines and the data lines bounds a plurality of pixels each having said contact hole, said contact hole in the pixel may be provided at a downstream in a rubbing direction with respect to the switching element of other pixel adjacent to the pixel.

The liquid crystal display device according to the one aspect of the present invention, wherein said scanning line may have a projecting portion overlapping said contact hole and/or said region where disclination occurs and shielding light.

The liquid crystal display device according to the one aspect of the present invention, further comprising a black matrix overlapping said data lines, wherein said black matrix may have a wide portion overlapping a region in the pixel between said data line and the projecting portion.

The liquid crystal display device according to the one aspect of the present invention, wherein said projecting portion may form electrostatic capacitance between the wiring.

In order to achieve the objects according to second aspect of the present invention, there is provided a liquid crystal display device manufacturing method, the liquid crystal display device comprising a thin film transistor, a wiring connected to said thin film transistor, a pixel electrode electrically connected to said wiring, and an alignment film formed on said pixel electrode, comprising steps of:

forming an insulating layer overlying the thin film transistor and the wiring;

forming a contact hole in the insulating layer through which an end portion of said wiring is exposed;

forming the pixel electrode on the insulating layer connected electrically with the wiring through the contact hole; and forming the alignment film on the pixel electrode, wherein the step of forming the contact hole comprising a step of forming the contact hole in a position overlapping a region where disclination occurs.

A liquid crystal display device manufacturing method according to the second aspect of the present invention, the insulating layer may include a plurality of laminated insulating films, the step of forming the contact hole comprising, for example, a step of forming openings in the plurality of the insulating films respectively.

A liquid crystal display device manufacturing method according to the second aspect of the present invention, the insulating layer including, for example, a passivation film formed on the switching element, a color layer formed on said passivation film, and a flattening film formed on said passivation film and color layer, the step of forming the contact hole comprising, for example, a step of forming openings in the passivation film, the color layer, and the flattening film, respectively, thereby forming the contact hole in a tapered shape as a whole.

BRIEF DESCRIPTION OF THE DRAWINGS

These objects and other objects and advantages of the present invention will become more apparent upon reading of the following detailed description and the accompanying drawings in which:

FIGS. 3A to 3I are views each showing the manufacturing process of the liquid crystal display device shown in FIG. 1;

FIG. 4 shows a result of examining a relationship between definition and contact hole area ratio;

DETAILED DESCRIPTION OF THE PREFERRED EMBODIMENTS

The liquid crystal display device of the present invention will be explained with reference to the drawings accompanying herewith. The liquid crystal display device of this embodiment is an active matrix liquid crystal display device having a TFT (Thin Film Transistor) as an active element.

Figure 1:
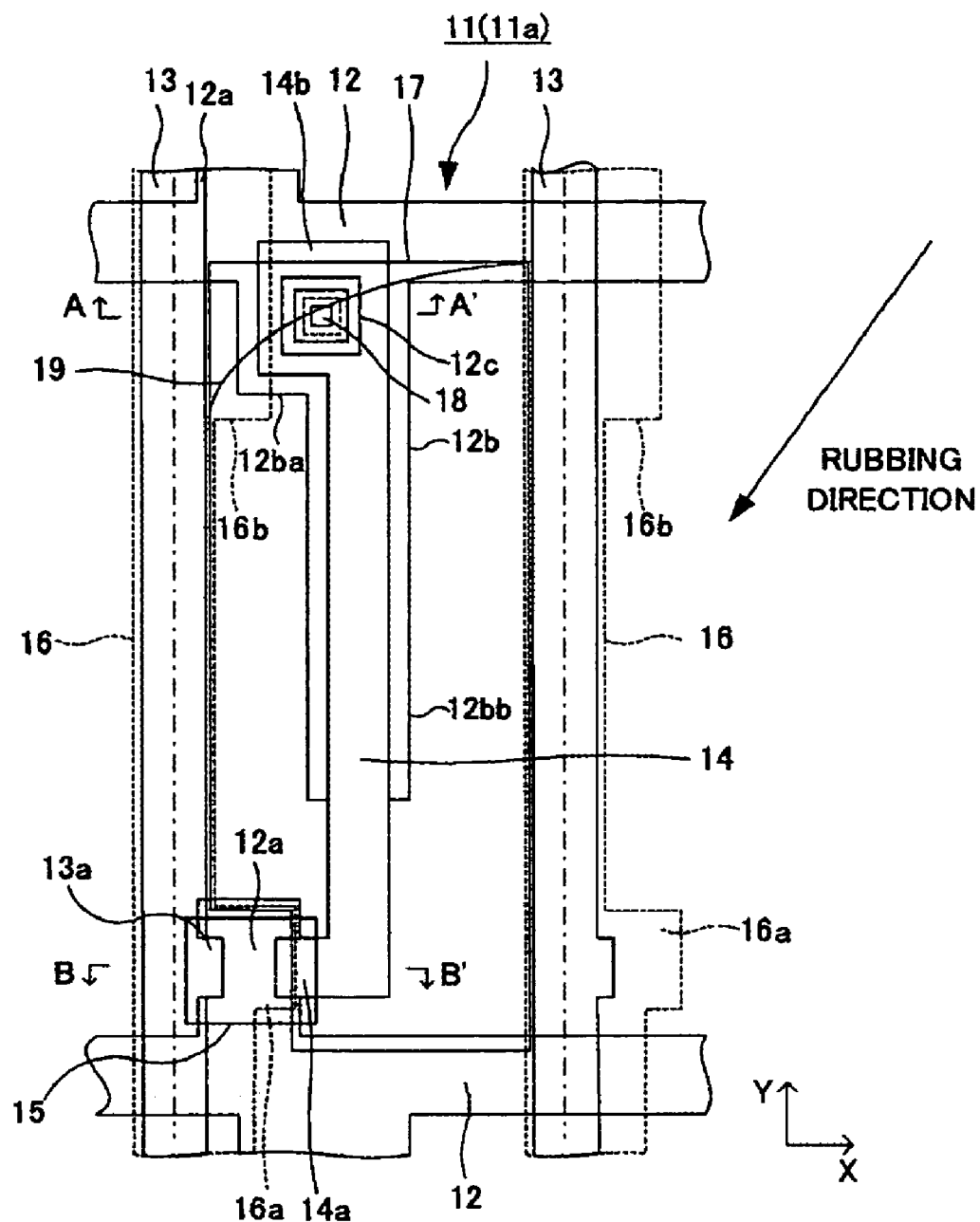
FIG. 1 is a plan view of a liquid crystal display device according to the present invention.
Figure 2:
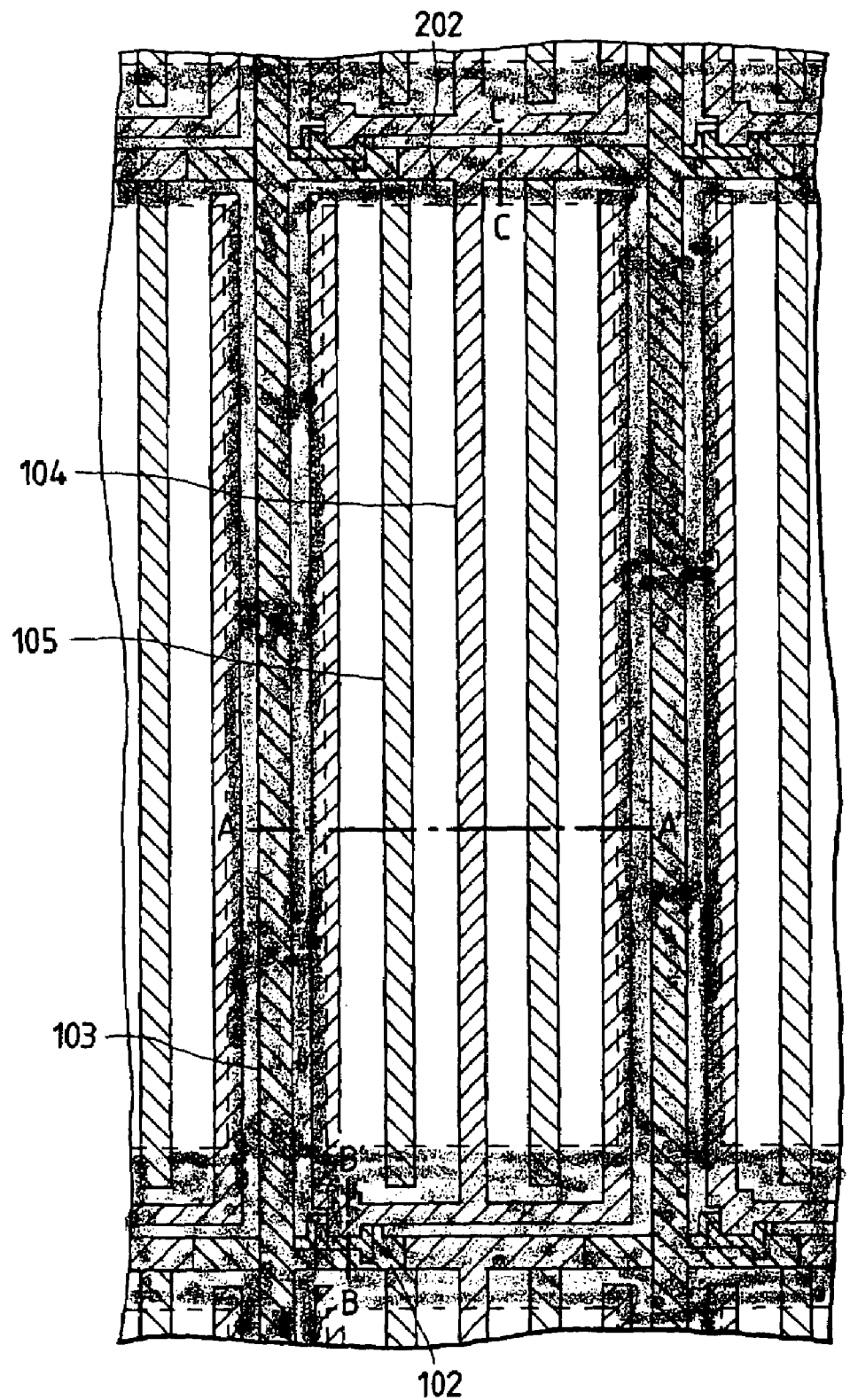
FIG. 2 is a view illustrating a cross-sectional structure of the liquid crystal display device illustrated in FIG. 1.

FIG. 1 is a plan layout of a unit pixel area 11a on a TFT substrate 100 of an active matrix liquid crystal display device 11 according to this embodiment. FIG. 2 shows a cross-sectional structure of the active matrix liquid crystal display device 11. This crosssectional view corresponds to a cross section taken in the direction of the arrows along line A–A' of TFT substrate 100 shown in FIG. 1, a cross section taken in the direction of the arrows along line B–B' thereof, and a cross section of end portion thereof.

As illustrated in FIG. 2, the liquid crystal display device 11 of this embodiment comprises a TFT substrate 100, an opposite substrate 200, and a liquid crystal 300.

The TFT substrate 100 and opposite substrate 200 are arranged to be opposite to each other via a spacer (not shown). The peripheral portions of the TFT substrate 100 and opposite substrate 200 are bonded to each other by seal material 109. The liquid crystal 300 is filled in a liquid crystal cell (sealed portion) formed of the TFT substrate 100, the opposite substrate 200, and the seal material 109.

The TFT substrate 100 has a first transparent substrate 101 formed of a transparent glass, transparent plastic, etc. On one surface of the first transparent substrate 101, a gate line 12 is formed. The gate line 12 is made of, for example, opaque metal such as chromium, aluminum, molybdenum, etc., or a laminated film of these materials.

The gate line 12 extends in an X-direction (horizontal direction in the figure) as illustrated in FIG. 1, and bounds the sides of X-direction of unit pixel area 11a. The gate line 12 has a first projecting portion 12a, which extends to a position overlapping the TFT in the unit pixel area 11a at the upper side in the figure, and a second projecting portion 12b, which extends in a Y-direction in the unit pixel area 11a at the lower side in the figure. The first projecting portion 12a constitutes a TFT gate electrode, as described later.

The second projecting portion 12b has a shield portion 12ba and a capacitance portion 12bb. The shield portion 12ba has a substantially square shape, overlaps the region for a contact hole 18 and shields it, as described later. It should be noted that an opening 12c for suppressing parasitic capacitance is formed at a position, which is a central portion of shield portion 12ba and overlaps with the contact hole 18 to be described later. The capacitance portion 12bb of the second projecting portion 12b is formed in such a way as to have a width narrower than that of the shield portion 12ba in the X-direction and extend in the Y-direction up to substantially the center of the unit pixel area 11a from the shield portion 12ba. The capacitance portion 12bb forms auxiliary capacitance between the source line 14 opposing thereto, as described later.

As illustrated in FIG. 2, a gate insulating film 102 is formed on the surface of first transparent substrate 101 and the gate line 12. The gate insulating film 102 is formed of a silicon oxide film, silicon nitride film, etc., or a laminated film of these materials.

A semiconductor island 103 is formed on the gate insulating film 102 over the first projecting portion 12a of gate line 12. The semiconductor island 103 is formed of amorphous silicon, polysilicon, etc. On the surface of semiconductor island 103, a region doped with impurity material such as phosphorus, etc. is formed. The doped region is divided into a source region and a drain region by a groove 103a. The semiconductor island 103 forms a TFT 15 together with the first projecting portion 12a functioning as a gate electrode.

As illustrated in FIG. 2, on the gate insulating film 102, a data line 13 and a source line 14 are formed on the gate insulating film 102. The data line 13 and source 14 are formed of, for example, metal such as chromium, aluminum, molybdenum, etc. or a laminated film of these materials.

The data line 13 extends in the Y-direction as illustrated in FIG. 1, and bounds the sides of Y-direction of unit pixel area 11a. The data line 13 has a drain electrode portion 13a, which extends in the X-direction up to TFT 15 in the unit pixel area 11a. As illustrated in FIG. 2, the drain electrode portion 13a comes in contact with one doped region of semiconductor island 103 of TFT 15 (drain region at the right of FIG. 2), thereby forming the drain electrode of TFT 15.

The source line 14 is formed at substantially the center of unit pixel area 11a extending in the Y-direction to be opposite to the second projecting portion 12b of gate line 12. One end 14a of source line 14 is connected to the source region of semiconductor island 103, and functions as a source electrode of TFT 15. The other end 14b of source line 14 is placed at the position overlapping an opening 12c surrounded by the second projecting portion 12b and connected to a pixel electrode 17 through the contact hole 18, to be described later.

It should be noted that the source line 14 is provided in substantially the center of unit pixel area 11a and separated from the gate line 12 and the data line 13, so that the probability of occurrence of shorts is relatively low.

As illustrated in FIG. 2, on the gate insulating film 102, a passivation layer 104 is formed to cover the data line 13, source line 14, semiconductor island 103, and so on. The passivation layer 104 is formed of silicon oxide, silicon nitride, etc. or a laminated film of these materials.

Moreover, on the passivation layer 104, a color layer 105 is formed. The color layer 105 is made of, for example, photosensitive resin, etc., and is formed on the passivation layer 104. The color layer 105 is provided one by one for each unit pixel area 11a, and is colored with any of colors, red, green and blue.

On the color layer 105, a black matrix 16 is formed. The black matrix 16 is made of light shielding (opaque) material such as resin material in which carbon particles are dispersed. As illustrated in FIG. 1, the black matrix 16 overlaps the data line 13 and is formed to be wider than the data line 13, masks the data line 13 against a backlight illumination.

Moreover, the black matrix 16 has a first wide portion 16a and second wide portion 16b each projecting in the X-direction. The first wide portion 16a is provided to overlap the TFT 15 formed region. The second wide portion 16b is provided to partially overlap the shield portion 12ba of second projecting portion 12b of gate line 12 and cover a gap between the data line 13 and the other end 14b of source line 14.

An overcoat layer 106 is formed in such a way as to cover the color layer 105 and black matrix 16. The overcoat layer 106 is formed of transparent resin, etc., and its surface is flattened.

On the overcoat layer 106, a pixel electrode 17 is formed. The pixel electrode 17 is made of transparent conductive material, such as ITO (Indium Tin Oxide).

The pixel electrode 17 is electrically connected to the source line 14 through the contact hole 18. The contact hole 18 is formed through the passivation layer 104, color layer 105, and overcoat layer 106. As illustrated in FIG. 1, the contact hole 18 is formed at a position overlapping the end portion 14b of source line 14, and has, for example, a cross section of a substantially square shape.

The forming region of contact hole 18 is required to be masked similar to TFT 15, data line 13, and the like. Here, the source line 14 is formed of a light shielding metal and the contact hole 18 is masked (shielded) by the end portion 14b of source line 14.

The contact hole 18, as illustrated in FIG. 2, comprises an opening 104a of passivation layer 104, an opening 105a of color layer 105, and an opening 106a of overcoat layer 106. The openings 105a and 106a are formed in a gentle taper shape. Moreover, a sidewall of the opening 105a of color layer 105 is coated with the overcoat layer 106 not to come in contact with the pixel electrode 17.

On the pixel electrode 17 and overcoat layer 106, an alignment film 107 is formed. The alignment film 107 is made of a polyimide resin, etc. The surface of alignment film 107 is subjected to alignment (orientation) process such as rubbing to a predetermined direction. The alignment film 107 aligns liquid crystal molecules in a predetermined direction.

Moreover, a polarization plate 108 is adhered onto the other surface of TFT substrate 100.

On the other hand, the opposite substrate 200 comprises a second transparent substrate 201, opposite electrode 202, and alignment film 203.

The second transparent substrate 201 is made of transparent glass, plastic, etc.

The opposite electrode 202 is formed of transparent conductive material such as ITO, and is placed on one surface of the second transparent substrate 201 to be opposite to pixel electrodes 17 on TFF substrate 100. The alignment film 203 is formed on the opposite electrode 202, and its surface is subjected to alignment process such as rubbing etc.

In order to drive the liquid crystal display device 11, a driver circuit (not shown) applies a gate pulse to the gate line 12 sequentially, and applies a data signal of voltage, corresponding to display gradation, to the data line 13 to be substantially synchronous with the gate pulse. TFT 15 connected to the gate line 12 to which the gate pulse is applied (selected) is activated. At this point, the voltage applied to the data line 13 is applied to the pixel electrode 17 via the drain electrode 13a, semiconductor island 103, source electrode 14a, source line 14, end portion 14b, and contact hole 18.

When the gate pulse is turned off, TFT 15 is inactivated. At this point, the voltage applied to the pixel electrode 17 is held in capacitance (pixel capacitance) between the pixel electrode 17 and the opposite electrode 202, and the auxiliary capacitance between the source line 14 and the capacitance portion 12b of gate line 12.

Resultantly, a voltage corresponding to the display gradation is applied to the liquid crystal 300 of each unit pixel area 11a before a next selected time, the liquid crystal 300 is aligned in a desired orientation, and the color of color layer 105 with a desired gradation is displayed.

In the above-structured liquid crystal display device 11, on the surface of alignment film 107, there exists a region subjected to uneven alignment treatment by rubbing. In such region, the so-called disclination occurs when the display operation is performed.

For example, as illustrated in FIG. 1, it is assumed that the rubbing direction is a direction indicated by an arrow (direction from the upper right portion in FIG. 1 to the lower left portion). In this case, in the TFT forming region of other unit pixel area 11a adjacent to the unit pixel area 11a shown in FIG. 1, since the surface projects as compared with other portions, the degree of rubbing is poor at the downstream side of rubbing (unit pixel area 11a, upper left region in FIG. 1) and alignment restriction power onto liquid crystal molecules is smaller than that of the other regions.

The boundary between domains having thus different alignment restriction power appears as, for example, a disclination line 19 formed from the upper right portion of unit pixel area 11a in FIG. 1 to the lower left portion at the time of display operation.

In this embodiment, as illustrated in FIG. 1, the contact hole 18 is formed at the position overlapping the region where disclination occurs (region where disclination line 19 appears). Therefor, the contact hole 18 is arranged at a downstream in a rubbing direction with respect to the TFT in other unit pixel area 11a adjacent to the shown unit pixel area 11a. According to this structure, not only contact hole 18 but also disclination occurring region is masked (shielded). Accordingly, as compared with the case in which a shielding portion for masking the contact hole and a shielding portion for masking disclination line 19 are individually provided, the display area can be ensured in high degree and a higher aperture ratio can be obtained.

Moreover, in the structure of this embodiment, the first wide portion 16a of black matrix 16 is provided between the end portion 14b of source line 14 and the adjacent data line 13. Therefor, the disclination line 19 between the source line 14 and data line 13 is even shielded by the first wide portion 16a of black matrix 16. Further, the other end (upper right portion of unit pixel area 11a) of disclination line 19 overlaps the gate line 12 accordingly, substantially the entirety of disclination forming region (disclination line 19) is shielded by the source line 14, gate line 12 and black matrix 16. Consequently, as compared with the case in which the structure for shielding the disclination line 19 is provided separately from the source line, gate line, source line, it is possible to obtain a higher aperture ratio.

An explanation will be next given of the method for manufacturing the above-structured liquid crystal display device 11 with reference to FIGS. 3A to 3I. It should be noted that the manufacturing method shown below is only one example, and any manufacturing method may be possible if the similar resultant can be obtained. Further, using materials are not limited to those shown below.

Figure 3A:
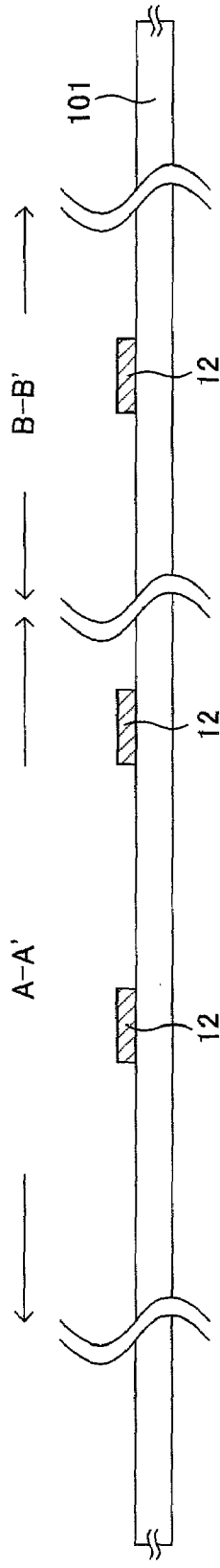

First, a metal film, made of chromium, etc., is formed on the surface of first transparent substrate 101, and the metal film is patterned to form the gate line 12 as illustrated in FIG. 3A. Next, as illustrated in FIG. 3B, an insulating film (gate insulating film 102) such as silicon oxide film, etc., is formed thereon.

Figure 3B:
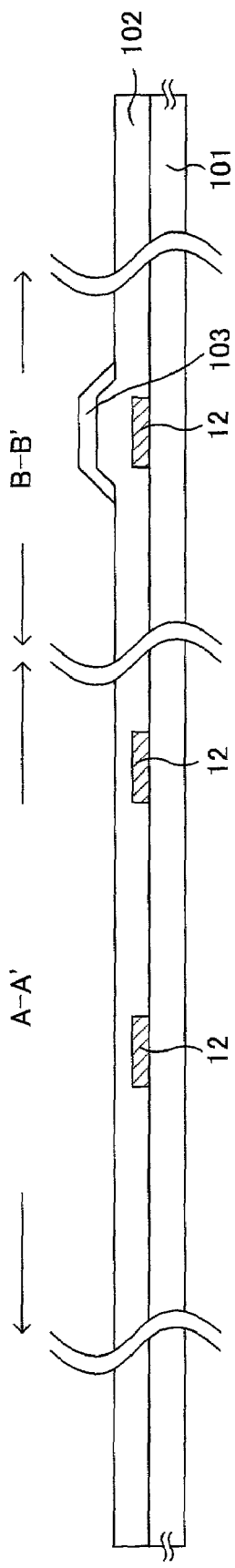

Then, as illustrated FIG. 3B, the semiconductor island 103 with a doped region, made of amorphous silicon, etc., is formed on the gate insulating film 102. The semiconductor island 103 is formed by depositing the semiconductor layer, doping the semiconductor layer with impurity material and patterning the semiconductor layer.

Figure 3C:
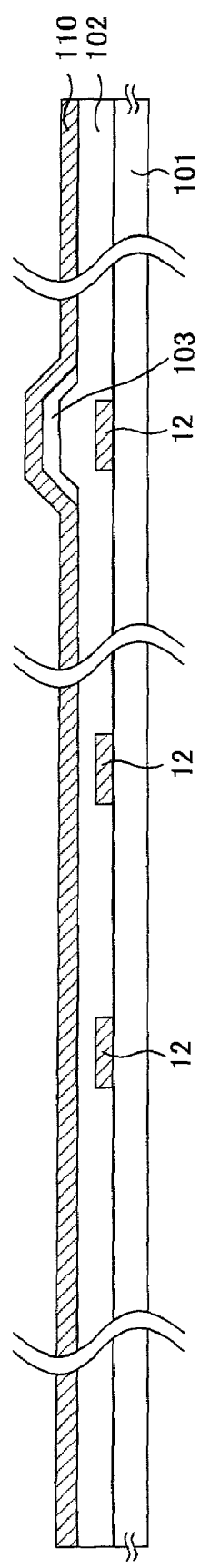
Figure 3D:
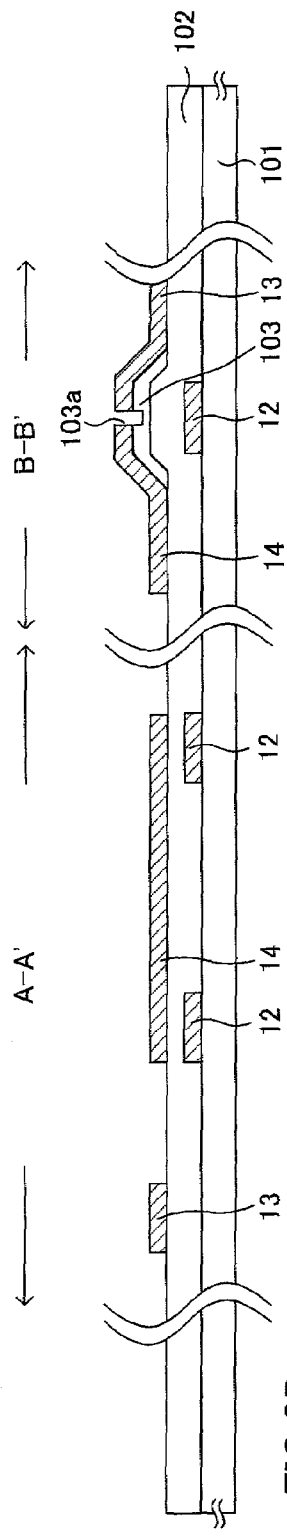

Sequentially, as illustrated in FIG. 3C, a metal layer 110, made of chromium, etc., is formed on the gate insulating film 102. Next, as illustrated in FIG. 3D, the metal layer 110 is patterned by lithography technique, etc., so as to form the above-shaped data line 13 and source line 14. At this time, the groove 103a, which divides the semiconductor island 103 into the source region and drain region, is formed on the semiconductor island 103.

Figure 3E:
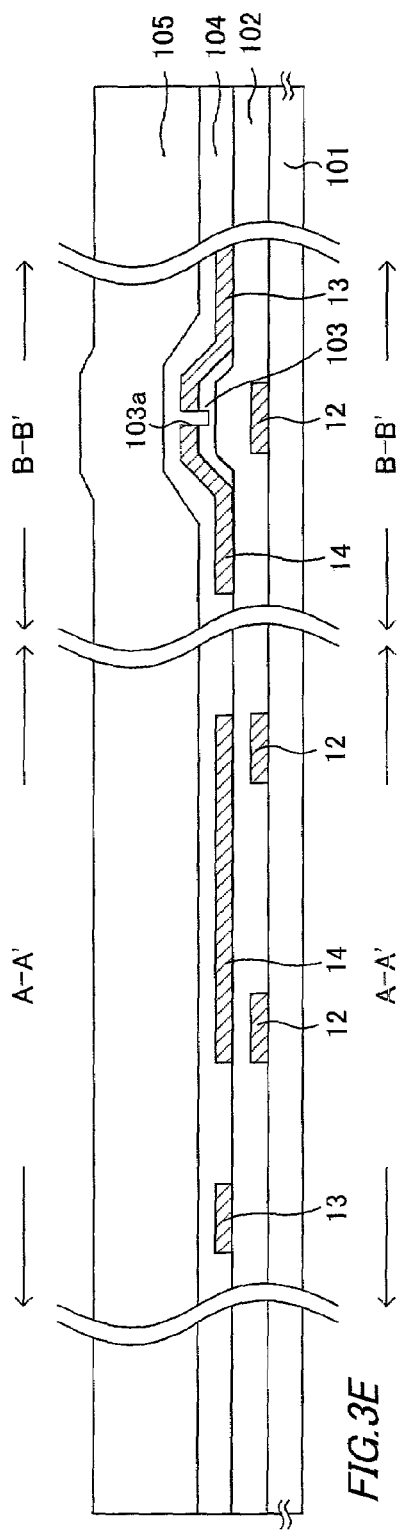

Next, as illustrated in FIG. 3E, the passivation layer 104, made of silicon oxide film, etc., and resin layer 105 are formed on the gate insulating film 102 sequentially to cover the data line 13 and the like.

After this, the resin layer 105 is patterned to have a gentle taper sidewall by isotropic etching and divided for each pixel. Next, the resin layer 105 is colored with any one of RGB so as to form the color layer 105.

Figure 3F:
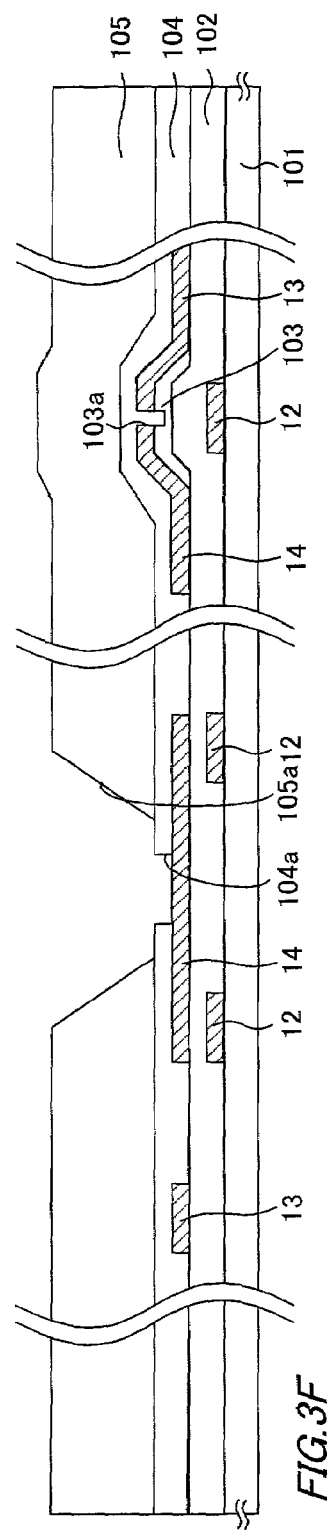

It should be noted that the color layer 105 might be formed by printing, etc., after forming the opening 104a on the passivation film 104. Next, as illustrated in FIG. 3F, an opening 105a is formed in the color layer 105. Here, the formation of each opening 103a, 104a is made by the individual lithography process, and the opening 105a of color layer 105 is formed to have a gentle taper sidewall.

Next, a shield film is formed on the color layer 105 and patterned so as to form the black matrix 16 in the above-described shape. Sequentially, as illustrated in FIG. 3G, a resin solution film is formed on the passivation layer 104 by spin coating, etc., and the resultant film is hardened so as to form the overcoat layer 106. The overcoat layer 106 is made of transparent resin material with high flattening effect, which flattens irregularities due to the color layer 105 and black matrix 16. Then, the opening 106a is formed on the overcoat layer 106 by isotropic etching, etc. The opening 106a is formed in such a way to cover the sidewall of the opening 105a of color layer 105 and have a gentle taper surface. In this way, the contact hole 18 having openings 106a, 104a, 105a is formed.

Next, as illustrated in FIG. 3H, a transparent conductive film such as ITO etc. is formed on the overcoat layer 106 to come in contact with the source line 14 through the contact hole 18 by sputtering. The transparent conductive film is patterned so that the pixel electrode 17 is formed in each pixel region. The pixel electrode 17 comes in contact with the source line 14 through the contact hole 18.

Figure 3I:
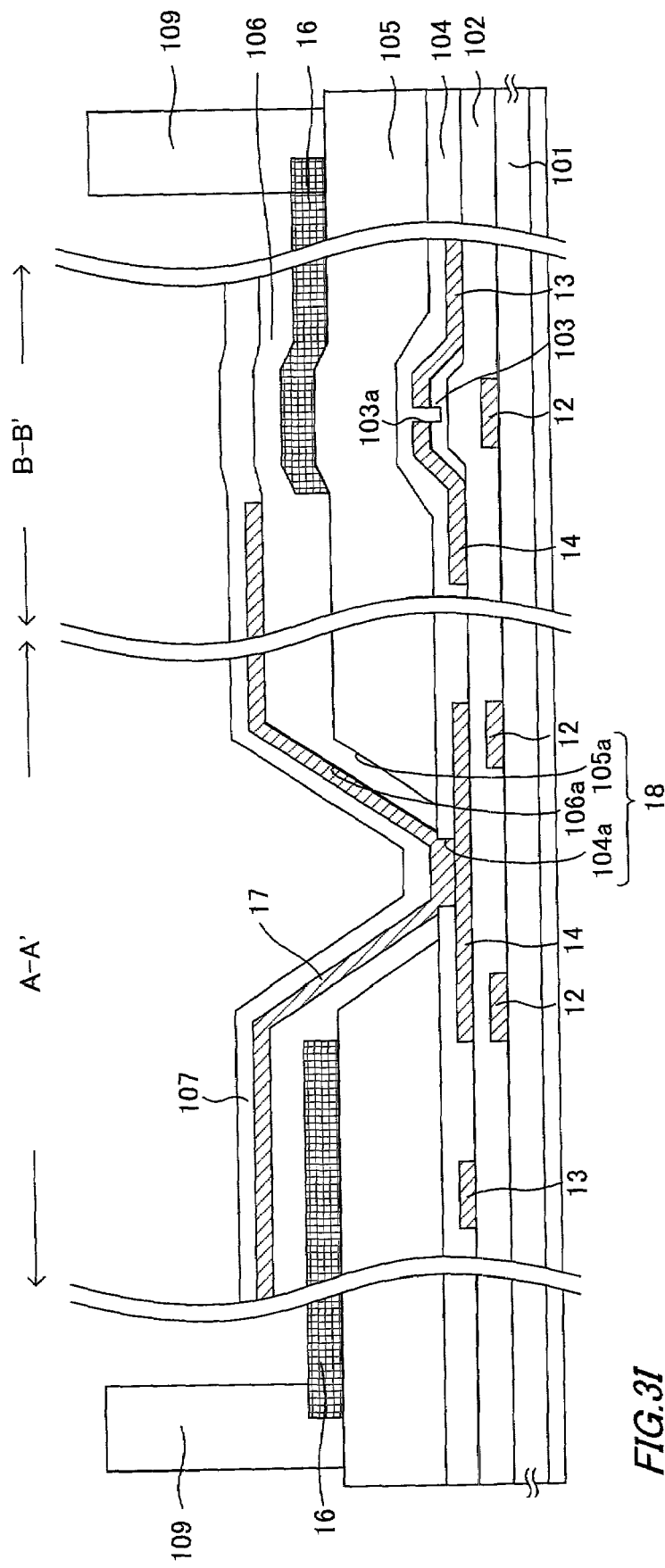

Sequentially, the alignment film 107, made of resin, etc., is formed on the pixel electrode 17, and its surface is rubbed to provide alignment process thereto. Moreover, seal member 109 is provided to the end periphery of liquid crystal display device 11. Still moreover, the polarization plate 108 is adhered onto the other surface of first transparent substrate 101. In this way, the TFT substrate 100 as illustrated in FIG. 3I is manufactured.

Next, the TFT substrate 100 thus manufactured is adhered to the opposite substrate 200 separately prepared to sandwich the spacer (not shown) in such a way that each alignment film 107 is opposed thereto. Then, the liquid crystal 300 is charged between two substrates. In this way, the liquid crystal display device 11 as illustrated in FIG. 2 is manufactured.

In the above-mentioned liquid crystal display device manufacturing method, the contact hole 18 is formed by forming the opening separately from the passivation layer 104, color layer 105 and overcoat layer 106. For this reason, alignment must be provided with each of three photo masks. If the photo masks are designed with consideration given to an error in alignment, there is a tendency for the diameter of contact hole 18 to increase. However, the disclination occurring region and the forming region of contact hole 18 overlaps with each other as in this embodiment, and this makes it possible to prevent decrease in the display area and to implement the high aperture ratio as compared with the case in which the contact hole is formed separately from the disclination forming region.

Moreover, in the case where the photosensitive resin is used as color layer 105, a light diffraction occurs when the photosensitive resin film is exposed or the photosensitive resin film isotropically dissolves in a development solution. For this reason, for example, there is a tendency for the diameter of contact hole 18 to increase as compared with the case in which an inorganic film is etched. However, the contact hole 18 is formed to overlap the disclination occurring region as in this embodiment, making it possible to implement a relatively high aperture ratio even if the diameter of contact hole 18 is relatively large.

EXAMPLE

We studied the reduction in aperture ratio with high definition by examining the relationship between the pixel pitch and area ratio of contact hole 18. The result is shown in FIG. 4.

Figure 5:
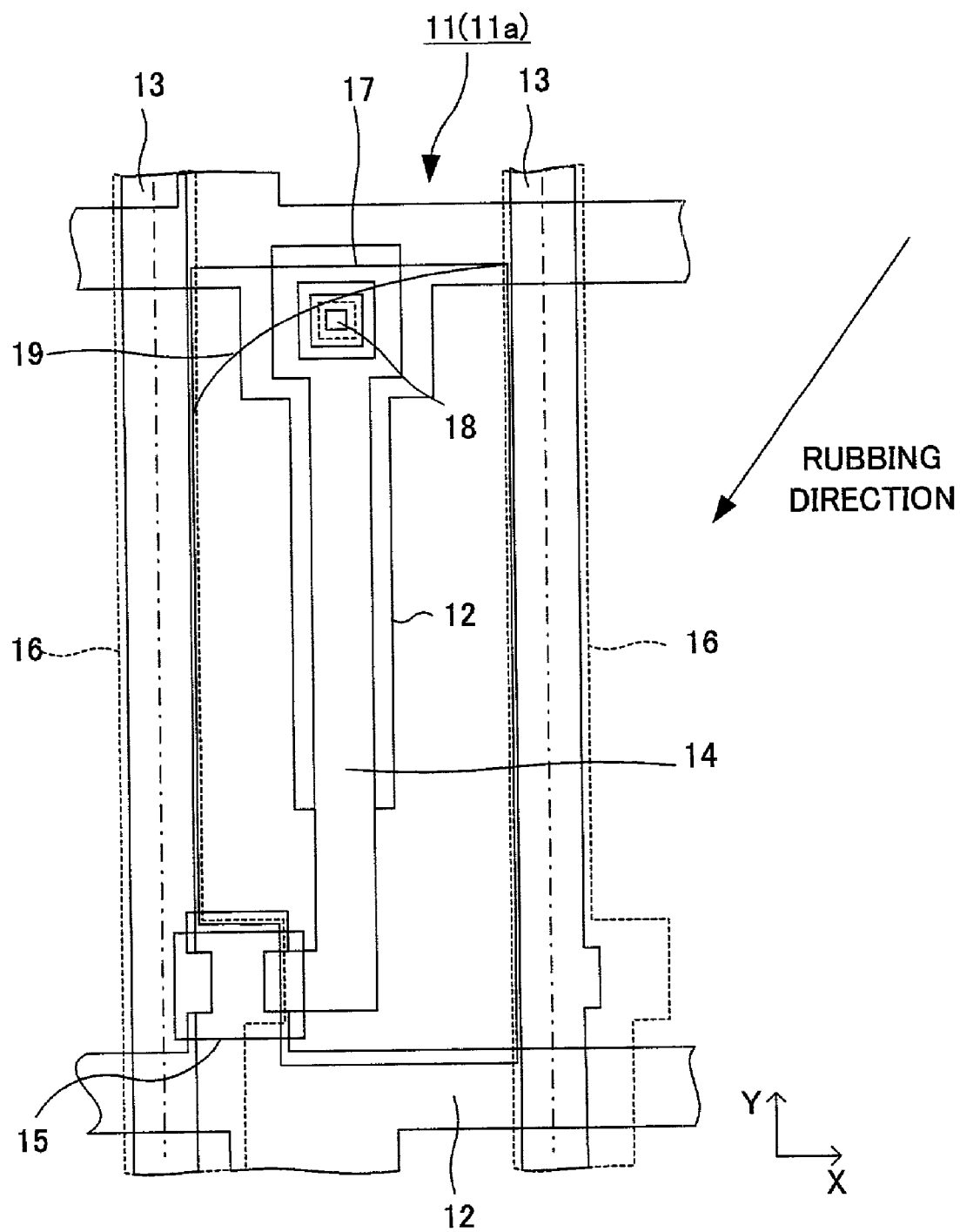
FIG. 5 is a plan view illustrating the structure of a liquid crystal display device according to a comparison.

FIG. 4 shows the result of studying the liquid crystal display device in which the contact hole 18 does not overlap the disclination line 19 as illustrated in FIG. 5. The structure illustrated in FIG. 5 has substantially the same structure as illustrated in FIG. 1 excepting the position of contact hole 18.

Moreover, in FIG. 5, it is assumed that the contact hole 18 has a square cross section and an outer diameter of 14 μm×14 μm regardless of the size of pixel. This outer diameter value is a value obtained when the outer diameter of opening of passivation layer 104 is 8 μm×8 μm and each side of the overlapping margin of overcoat layer 106 and color layer 105 is 1.5 μm. At this time, it is assumed that one contact hole 18 with a cross-sectional area of 196 μm² exists in the unit pixel area 11a.

If the percentage of contact hole 18 area occupying the pixel area is set to the area ratio of contact hole 18, the area ratio of contact hole 18 is calculated as follows:

More specifically, the respective pixels with a size of 100 μm×300 μm, which display red, blue and green colors, are combined with each other so as to produce color display. For example, in the case where the pixel pitch is 300 μm, 0.65%, which is a ratio between pixel size of 100 μm×300 μm and the contact hole area of 196 μm², is calculated as an area ratio of contact hole 18 of each pixel. In this way, the pixel pitch, definition, and area ratio of contact hole 18 can be calculated as illustrated in FIG. 4.

In the case where definition is lower than 100 dpi (dot per inch) as illustrated in FIG. 4, the area ratio of contact hole 18 is low as under 1%. This is because when definition is low, the contact hole 18 is overlapped the gate line 12 or data line 13, making it possible for the size of contact hole 18 to have no bearing on the actual aperture ratio.

However, in the case where definition exceeds 150 dpi, the wiring become thin, and this makes it impossible to mask the contact hole 18 completely. For this reason, in the case where the pixel pitch is about 126 μm and definition is 200 dpi, contribution of contact hole 18 area reaches 3.70% of the pixel area, and this is so large that it may not be ignored in view of the calculation of aperture ratio.

Accordingly, regarding definition of over 200 dpi, the need for providing the shield region for masking disclination comes about. Namely, in the case where the pixel pitch is large, disclination can be masked by the wiring. However, the width of wiring becomes thinner together with miniaturization, resulting that disclination appears in the display region. Though this requires the structure for masking the region where disclination occurs, the aperture ratio decreases if such a structure is provided. Therefor, there is needed a method for shielding the region where disclination occurs without decreasing the aperture ratio.

Here, the effect obtained when the region where disclination occurred was masked with the source line 14, gate line portion 12 and black matrix 16 using the structure shown in FIG. 5 was estimated. It should noted that the pixel pitch is 126 μm, the outer diameter of the cross section of contact hole 18 is 8 μm×8 μm, and alignment margin of each layer is 1.5 μm.

This estimation showed that according to the structure of FIG. 1 where disclination line 19 overlapped the contact hole 18, the aperture ratio improved by 5.5% as compared with the structure of FIG. 5. At this time, since the aperture ratio is about 4.0%, the aperture ratio can be relatively improved by about 13.8%. This result shows that the structure where the disclination occurring region overlaps the forming region of contact hole 18 can implement the high aperture ratio even in high definition of about 200 dpi.

As explained above, according to this embodiment, there is provided the structure in which the forming region of contact hole 18 and the disclination occurring region overlap with each other. According to the structure using common elements for masking each region it is possible to obtain a higher aperture ratio as compared with the case in which the common masking elements is used.

Moreover, the above configuration is more effectively applicable to the case in which definition is high, for example, 200 dpi or less. Namely, in the case where definition is high and the area of contact hole in the pixel cannot be ignored, the use of the above structure can obtain the high aperture ratio. Particularly, in the CF-On TFT 15 structure, which is required to form the openings on the plurality of layers individually, the diameter of contact hole 18 for ensuring the alignment margin tends to be increased. Accordingly, the above structure can be effectively used for suppressing the reduction in the aperture ratio even if definition progresses.

The above explained the preferred embodiment of the present invention. However, the present invention is not limited to the above embodiment, and variations and addition may be possible without departing from the broad sprit and scope of the invention.

Figure 6:
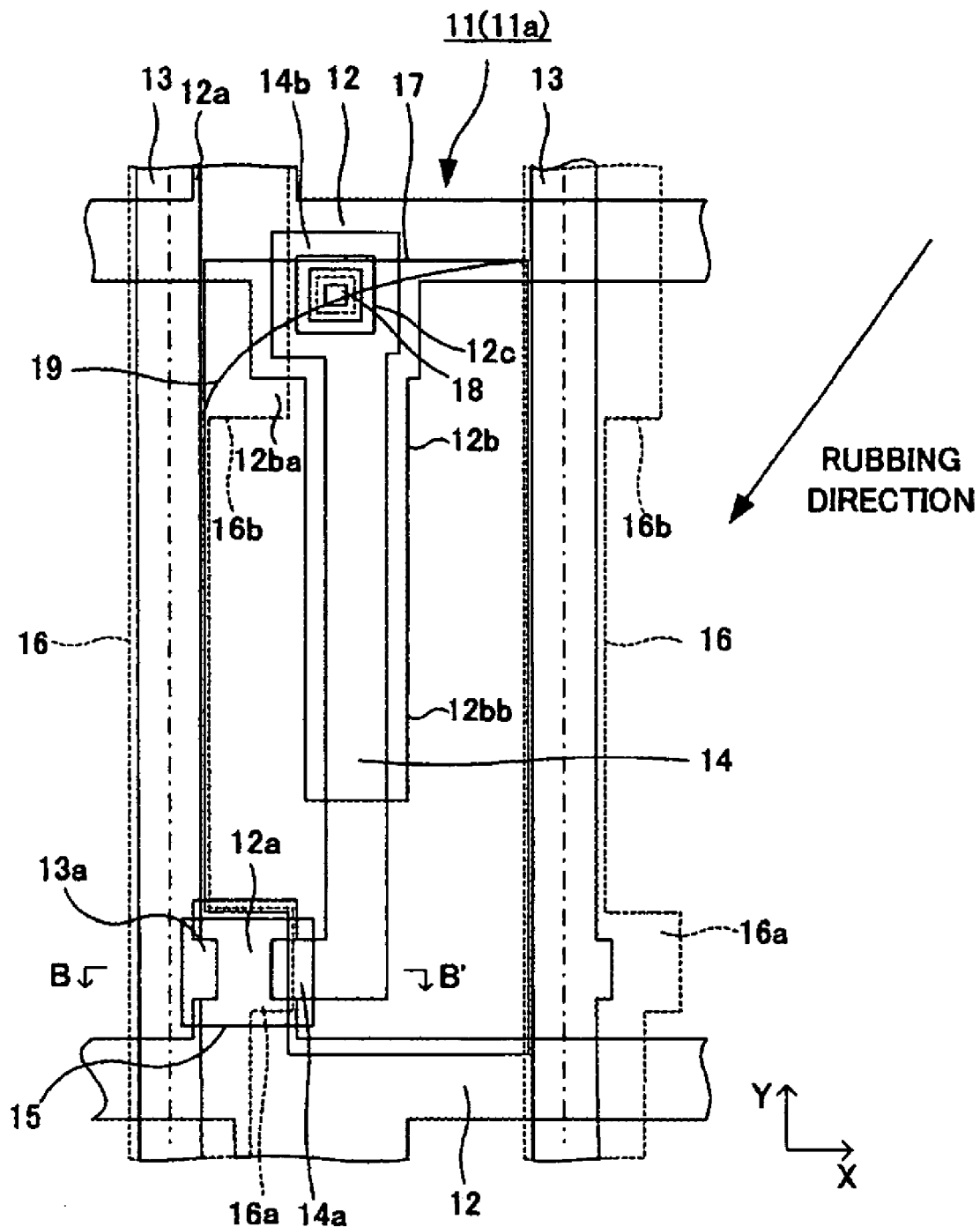
FIG. 6 is a view illustrating another embodiment of the present invention.

In the above embodiment, the contact hole 18 passing through the wide end portion 14b of source line 14 was formed. However, the shape of source line 14 and the position of contact hole 18 are not limited to the above example, and any configuration may be possible if capacitance can be formed between the gate line 12 and source line 14, and the regions for the contact hole 18 and disclination can effectively be masked. For example, as illustrated in FIG. 6, the source line 14 may be formed to overlap not only the second projecting portion 12b of gate line 12 but also the main line thereof. In this configuration, the regions for the contact hole 18 and/or disclination are shielded by the main line of gate line 12.

Moreover, in the aforementioned embodiment, the passivation layer 104 was formed on the data line 13. However, even in the configuration without passivation layer 104, the same effect can be obtained.

Still moreover, in the aforementioned embodiment, rubbing was performed in the rubbing direction as illustrated in FIG. 1 and the disclination line 19 occurred as illustrated in the figure. However, even if the rubbing direction is the other direction and the disclination line 19 is formed at the position different from that of FIG. 1, the present invention can be applied. In this case, for example, if disclination occurs at the other corner of pixel region, the contact hole 18 is formed to overlap the location of occurrence, so that the effect of the present invention can be, of course, obtained.

Still moreover, in the aforementioned embodiment, one contact hole 18 for connecting TFT 15 to the pixel electrode 17 is formed. For this, the reduction in the aperture ratio is minimized by the presence of contact hole 18. However, the present invention can be, of course, applied to the case in which a plurality of contact holes is formed.

Still moreover, the active element (switching element) may be not only TFT 15 but also MIM, diode, etc. In addition, TFT 15 may such a forward staggered type that the gate electrode is positioned at the opposite side of first transparent substrate 101 against the semiconductor layer, instead of a reverse staggered type.

Furthermore, the aforementioned embodiment was explained using an example of the so-called CF (Color Filter)-On TFT structure in which the color layer 105 was formed on the TFT substrate 100. However, the present invention can be applied to the structure in which the color layer 105 is formed on the opposite substrate 200. In other words, the present invention can be applied to any liquid crystal display device if the forming region of contact hole 18 and disclination forming region are arranged to overlap with each other.

Still furthermore, the aforementioned embodiment explained the case in which the active matrix liquid crystal display device was applied to the active matrix liquid crystal display device of a vertical electric field type. However, the present invention can be applied to the other liquid crystal display devices such as a simple matrix type liquid crystal display device, ferroelectric liquid crystal display device, polymer dispersion type liquid crystal display device or IPS (In Plane Switching) type liquid crystal display device.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-049492 filed on Feb. 23, 2001 and including specification, claims, drawings and summary. The disclosure of the above Japanese Patent Application is incorporated herein by reference in its entirety.

What is claimed is:

1. A liquid crystal display device comprising:
    a pair of substrates;
    a liquid crystal sealed between said pair of substrates;
    a plurality of data lines and a plurality of scanning lines, being arranged on one surface of one of said pair of substrates and crossing each other;
    a switching element having one end of a current path connected to a data line and a control end connected to a corresponding first scanning line;
    a wiring connected to the other end of the current path of said switching element, said wiring extending to and overlapping a second one of said plural scanning lines;
    an insulating layer, being formed on said wiring and having a contact hole through which an end portion of said wiring is exposed;
    a pixel electrode, being formed on said insulating layer and electrically connected to the end portion of said wiring through the contact hole; and
    an alignment film, being formed on said pixel electrode and in contact with said liquid crystal,
    wherein said contact hole is formed at a position overlapping a region where disclination occurs,
    wherein said insulating layer is formed of a plurality of laminated insulating films,
    the insulating films have openings individually which form said contact hole in a tapered shape as a whole, and
    wherein said insulating films includes a passivation film formed on the switching element, a color layer formed on said passivation film, and a flattening film formed on said passivation film and color layer,
    said contact hole includes openings formed in the passivation film, the color layer, and the flattening film, respectively, and
    the openings being formed in a tapered shape as a whole.

2. The liquid crystal display device according to claim 1, wherein said wiring is made of a light shielding material, and
    said contact hole and at least a part of said region where disclination occurs are shielded by said wiring.

3. The liquid crystal display device according to claim 1, wherein the scanning lines and the data lines bounds a plurality of pixels each having said contact hole,
    said contact hole in the pixel is provided at a downstream in a rubbing direction with respect to the switching element of other pixel adjacent to the pixel.

4. The liquid crystal display device according to claim 1, wherein said second scanning line has a projecting portion overlapping at least one of said contact hole and said region where disclination occurs, said projecting portion of said second scanning line shielding light.

5. The liquid crystal display device according to claim 4, further comprising a black matrix overlapping said data lines, wherein said black matrix has a first portion that is wider than other portions of said black matrix and that overlaps a region in the pixel between said data line and the projecting portion of said second scanning line.

6. The liquid crystal display according to claim 5, wherein said black matrix overlaps an entirety of said data lines.

7. The liquid crystal display device according to claim 4, wherein said projecting portion overlaps said wiring so as to form an electrostatic capacitance between the wiring and said projecting portion.

8. A liquid crystal display device comprising:
a pair of substrates;
a liquid crystal sealed between said pair of substrates;
a plurality of data lines and a plurality of scanning lines, being arranged on one surface of one of said pair of substrates and crossing each other;
a switching element having one end of a current path connected to the corresponding data line and a control end connected to the corresponding scanning line;
a wiring connected to the other end of the current path of said switching element;
an insulating layer, being formed on said wiring and having a contact hole through which an end portion of said wiring is exposed;
a pixel electrode, being formed on said insulating layer and electrically connected to the end portion of said wiring through the contact hole;
an alignment film, being formed on said pixel electrode and in contact with said liquid crystal; and
a black matrix overlapping said data lines,
wherein said black matrix has a first portion that is wider than other portions of said black matrix and that overlaps a region in the pixel between said data line and a portion of said scanning line that projects into the pixel,
wherein said contact hole is formed at a position overlapping a region where disclination occurs, and
wherein said wiring is made of a light shielding material, and
said contact hole and at least a part of said region where disclination occurs are shielded by said wiring.

9. The liquid crystal display device according to claim 8, wherein said insulating layer is formed of a plurality of laminated insulating films,
the insulating films have openings individually which form said contact hole in a tapered shape as a whole.

10. The liquid crystal display device according to claim 9, wherein said insulating films includes a passivation film formed on the switching element, a color layer formed on said passivation film, and a flattening film formed on said passivation film and color layer,
said contact hole includes openings formed in the passivation film, the color layer, and the flattening film, respectively, and
the openings being formed in a tapered shape as a whole.

* * * * *